United States Patent [19]

Tajiri et al.

[11] Patent Number: 4,639,476

[45] Date of Patent: Jan. 27, 1987

[54] EPOXY RESIN POWDER COATING COMPOSITION

[75] Inventors: Kazuhiro Tajiri; Michio Kohmoto; Kiyoshi Saito; Hitoshi Takahira, all of Osaka, Japan

[73] Assignee: Nitto Electric Industrial Co., Ltd., Osaka, Japan

[21] Appl. No.: 749,251

[22] Filed: Jun. 27, 1985

[30] Foreign Application Priority Data

Jun. 27, 1984 [JP] Japan .......... 59-133494
Sep. 22, 1984 [JP] Japan .......... 59-198886
Feb. 19, 1985 [JP] Japan .......... 60-30722

[51] Int. Cl.[4] .......... C08K 3/40

[52] U.S. Cl. .......... 523/213; 523/220; 523/444; 523/466

[58] Field of Search .......... 523/213, 220, 444, 466

[56] References Cited

U.S. PATENT DOCUMENTS 3,485,789 12/1969 Guilbault .......... 523/444
3,668,177 6/1972 Van Herpt .......... 523/444
4,581,293 4/1986 Saunders .......... 523/466

FOREIGN PATENT DOCUMENTS 58-168619 10/1983 Japan .......... 523/220
60-55066 3/1985 Japan .......... 523/444

*Primary Examiner*—Lewis T. Jacobs
*Attorney, Agent, or Firm*—Sughrue, Mion, Zinn, Macpeak and Seas

[57] ABSTRACT

An epoxy resin powder coating composition is described, comprising an epoxy resin and at least a hardener and a filler compounded thereto, wherein the filler is a mixture of from 30 to 180 parts by weight of a needle-like glass powder having an average length of at least 40 μm and an aspect ratio of at least 4:1 and at least 30 parts by weight of a granular inorganic filler having an average particle diameter of 1.0 μm or less, both being based on 100 parts by weight of the epoxy resin. This powder coating composition can provide a coating exhibiting excellent impact resistance not only at room temperature but also at lower temperatures, and further having good flexibility. A steel member with the coating of the present powder coating composition has a high practical value.

12 Claims, No Drawings

EPOXY RESIN POWDER COATING COMPOSITION

FIELD OF THE INVENTION

The present invention relates to an epoxy resin powder coating composition. More particularly, it is concerned with an epoxy resin powder coating composition which can form a coating having an excellent impact resistance not only at room temperature but also at low temperatures.

BACKGROUND OF THE INVENTION

An epoxy resin powder coating composition usually comprises an epoxy resin with a hardener and a granular inorganic filler compounded thereto. This coating composition has been widely used as an anticorrosive paint for ships, vehicles, large-sized structures, and so forth because it exhibits excellent adhesion to members to be coated and also excellent anticorrosion properties.

The epoxy resin coating composition, however, has a disadvantage in that although a coating formed using the coating composition generally exhibits good impact resistance at room temperature, its impact resistance at low temperatures is unsatisfactorily low. In order to overcome the above defect, several methods have been proposed: a method in which the thickness of the coating is increased, a method in which the amount of the granular inorganic filler is increased, and a method in which a flaky inorganic filler is used in place of the granular inorganic filler.

The above methods, however, undesirably lower the flexibility of the coating. If the coating has a poor flexibility, cracks tend to develop therein during handling of members with the coating.

SUMMARY OF THE INVENTION

As a result of extensive investigations to provide an epoxy resin coating composition which can form a coating having good flexibility and also exhibiting excellent impact resistance not only at room temperature but also at low temperatures, it has been found that the object can be attained by employing specified amounts of a granular inorganic filler and a specific needle-like glass powder as fillers which are compounded to an epoxy resin.

Accordingly, an object of the present invention is to provide an epoxy resin coating composition comprising an epoxy resin with at least a hardener and a filler compounded thereto, wherein the filler is a mixture of from 30 to 180 parts by weight per 100 parts by weight of the epoxy resin of a needle-like glass powder having an average length of at least 40 μm and an aspect ratio of at least 4, and at least 30 parts by weight per 100 parts by weight of the epoxy resin of a granular inorganic filler having an average particle diameter of 1.0 μm or less.

DETAILED DESCRIPTION OF THE INVENTION

It is known that the needle-like glass powder is a filler having a great reinforcing effect. When, however, the needle-like glass powder is used as a filler for an epoxy resin coating composition, a coating formed using the resulting composition is markedly decreased in flexibility. For this reason, in the preparation of conventional epoxy resin coating composition, such a needle-like glass powder has been rarely compounded.

According to the present invention, however, it has been found that if a mixture of the needle-like glass powder and granular inorganic filler is used as a filler for the epoxy resin powder coating composition and, furthermore, those are added in the specified amounts, the resulting epoxy resin powder coating composition can provide a coating having good flexibility and further exhibiting excellent impact resistance not only at room temperature but also at low temperatures.

Epoxy resins which can be used in the present invention are glycidyl ether-type epoxy resins such as bisphenol A-type epoxy resins and novolak-type epoxy resins. Bisphenol A-type epoxy resins are particularly preferred. When these bisphenol A-type epoxy resins are used, suitable amounts of other epoxy resins such as bisphenol F-type epoxy resins can be used in combination therewith to increase the heat resistance and the like of the coating composition. In this case, it is preferred that the amount of the bisphenol A-type epoxy resin used is at least 70% by weight based on the total weight of all the epoxy resins used.

The epoxy resins having a molecular weight of from 900 to 3,600 and an epoxy equivalent of from 450 to 1,800 are generally preferably used in the present invention. If the epoxy equivalent is too small, the resulting epoxy resin powder coating composition tends to cause blocking and the coating workability is undesirably reduced. On the other hand, if the epoxy equivalent is too large, the melt viscosity of the coating composition is excessively increased and a uniform coating cannot be obtained.

The preferred epoxy resins are ones that the ratio of the number of unreactive terminal groups, i.e., terminal groups other than the epoxy group (e.g., glycol and chlorohydrin resulting from ring opening of the epoxy group) to the total number of groups is less than 5:100. If this ratio is too large, the flexibility and impact resistance of the coating are adversely influenced.

The hardener which can be used in the present invention is appropriately selected from hardeners which are commonly used in the conventional epoxy resin powder coating composition. Examples of such hardeners are amine-based hardeners such as aromatic diamines (e.g., diaminodiphenylamine), aliphatic amine/aliphatic dicarboxylic acid condensates, dicyandiamide, and imidazoles; organic acid anhydride-based hardeners such as tetrahydrophthalic anhydride, benzophenonetetracarboxylic anhydride, and trimellitic anhydride; and phenol-based hardeners such as a phenol resin and bisphenol A. The hardener is generally used in an amount of from 0.5 to 1.5 equivalents per epoxy equivalent of the epoxy resin.

The filler which is added to the coating composition of the present invention comprises a specified needle-like glass powder and a specified granular inorganic filler.

The needle-like glass powder has an average length of at least 40 μm, preferably at least 50 μm, and particularly preferably from 50 to 350 μm, an aspect ratio (average length/average diameter) of at least 4:1, preferably at least 5:1, and particularly preferably from 5:1 to 100:1, and an average diameter of from 1 to 30 μm.

If the average length of the needle-like glass powder is less than 40 μm, or the aspect ratio is less than 4:1, the resulting coating composition can provide only a coating having poor impact resistance particularly at low temperatures (0° C. or less). On the other hand, if the average length is too large, it becomes sometimes difficult to prepare a powder coating composition and the smoothness of the coating is undesirably reduced.

The needle-like glass powder used in the present invention is a rod-shaped piece, the diameter of which is substantially constant (within the tolerance of about ±10%) along the whole lengthwise direction thereof. Such a needle-like glass powder can be obtained by pulverizing conventional glass fibers. Of course, needle-like glass powders having forms other than the rod-like form can be used so long as their aspect ratio (long axis/short axis) and so forth are within the above-specified ranges.

The term "aspect ratio" is the art-recognized term in the sence of a shape coefficient of an article, and the term is used in the present invention to indicate the shape of a particle. That is, the aspect ratio is used to indicate the long axis/short axis ratio of the particle. For example, in the case or rod-shaped particles, the aspect ratio indicates (length of the rod/diameter of the rod) ratio. In the case of particles having a form other than the rod-like form, the aspect ratio indicates (maximum length/maximum length in a direction at right angles to the maximum length) ratio.

The above aspect ratio is generally determined by a method in which the images of particles are obtained by, for example, a microscopic photograph, and the long axis/short axis ratio is measured. In this case, it is preferred that the average value of at least 500 particles be employed.

It is preferred to use a needle-like glass powder the surface of which has been treated with a silane coupling agent, because of this surface treatment increases the wettability between the glass and the epoxy resin, thereby increasing the adhesion therebetween, and makes it possible to prevent penetration of water in the interface between the glass and the epoxy resin. Thus, the anticorrosion properties of the coating are increased, and the corrosion of a coated member due to the swelling of the coating caused by the penetration of water and also due to the reduction in the insulation properties of the coating can be sufficiently prevented.

Silane coupling agents which are preferably used for this purpose include aminosilanes such as N-phenyl-γ-aminopropyltrimethoxysilane. n-β-(aminoethyl)-γ-aminopropyltrimethoxysilane, and γ-aminopropyltriethoxysilane; epoxy-silanes such as γ-glycidoxypropylmethyldiethoxysilane and β-(3,4-epoxycyclohexyl)ethyltrimethoxysilane; and mercaptosilanes such as γ-mercaptopropyltrimethoxysilane.

The amount of the needle-like glass powder used is from 30 to 180 parts by weight, preferably from 50 to 160 parts by weight, and particularly preferably from 60 to 150 parts by weight, per 100 parts by weight of the epoxy resin. If the amount of the needle-like glass powder used is less than 30 parts by weight, the resulting powder coating composition can provide only a coating having poor impact resistance particularly at low temperatures. On the other hand, if the amount thereof is more than 180 parts by weight, the smoothness and flexibility of the coating are reduced.

The granular inorganic filler which is used in combination with the needle-like glass powder has an average particle diameter of 1.0 μm or less and preferably from about 0.1 to 0.7 μm. If the average particle diameter is more than 1.0 μm, the coating formed has a poor flexibility. It is preferred that the aspect ratio as defined before be 2:1 or less.

Examples of the granular inorganic filler are titanium dioxide, barium sulfate, fused silica, alumina, and calcium carbonate, each having an average particle diameter of 1.0 μm or less and an aspect ratio of 2:1 or less.

It is preferred for the granular inorganic filler to be subjected to the surface treatment to increase its wetting properties to the epoxy resin. The particularly preferred surface treatment is a Zn-Al-Si treatment. In addition, surface treatments using Al alone, or together with a resin acid, a fatty acid, a silane coupling agent, and/or a titanium coupling agent can be employed depending on the type of the filler.

The above Zn-Al-Si treatment comprises coating the hydrates of silicic acid, aluminum oxide and zinc oxide on the surface of the filler, thereby improving the affinity of the epoxy resin to the filler and the hydrophilic properties of the filler.

This surface treatment increases the adhesion between the granular inorganic filler and the epoxy resin in the coating and, therefore, as in the case of the surface treatment of the needle-like glass powder, can increase the anticorrosion and insulation properties of the coating.

The amount of the granular inorganic filler used is at least 30 parts by weight, preferably from 30 to 150 parts by weight, and particularly preferably from 40 to 140 parts by weight, per 100 parts by weight of the epoxy resin. If the amount of the granular inorganic filler used is less than 30 parts by weight, the resulting epoxy resin powder coating composition can provide only a coating having a poor flexibility. On the other hand, if the amount thereof is too large, the smoothness of the coating is reduced.

The epoxy resin powder coating composition of the present invention comprises the above-described epoxy resin, hardener, needle-like glass powder, and granular inorganic filler as essential constituents. In addition to these constituents, the composition may further contain, if desired and necessary, additives such as pigment, a leveling agent, a hardening accelerator and a flow-adjusting agent. The amount of the additive used is usually 5 parts by weight or less per 100 parts by weight of the epoxy resin.

The epoxy resin powder coating composition according to the present invention can be prepared by either a melt mixing method or a dry mixing method. It is preferred to employ the melt mixing method. This melt mixing method includes a step where the constituents are melt mixed and then pulverized to a predetermined particle size. At this pulverization step, therefore, the size of the filler, i.e., the average length and aspect ratio of the needle-like glass powder or the average particle diameter of the granular inorganic filler, may change during pulverization.

In preparing the powder coating composition of the present invention, the following procedure is preferably employed particularly when it is desired to more increase the flexibility of the hardened coating.

At least 80 wt% of the needle-like glass powder+-granular inorganic filler and at least 50 wt%, preferably at least 80 wt%, of the epoxy resin are preliminarily melt mixed and pulverized to form a powder and, thereafter, the resulting powder and the remainder ar melt mixed and pulverized to form the desired powder coating composition.

This method is particularly effective when the needle-like glass powder is used in an amount of at least 100 parts by weight per 100 parts by weight of the epoxy resin.

It is important in the present invention that the size of the filler after pulverization falls within the above-specified range, and the above effects of the present invention can be obtained even using needle-like glass powders and granular inorganic fillers which do not satisfy the above-specified size requirements so long as the size of the filler after pulverization can satisfy the requirements. For example, under the conditions of preparation of the powder coating composition shown in the example as described hereinafter, the average length of the needle-like glass powder after pulverization changed to 90 to 95% of the length before compounding, whereas the average diameter of the needle-like glass powder and the average particle diameter of the granular inorganic filler remained unchanged.

The particle size of the epoxy resin powder coating composition of the present invention prepared by either the melt mixing method or the dry mixing method varies depending on the purpose of use of the powder coating composition. The maximum particle size thereof if generally from about 200 to 40 mesh.

The epoxy resin powder coating composition of the present invention can be coated by conventional coating techniques such as an electrostatic spray method, an electrostatic dipping method, and a fluid dipping method. When coated, the composition adheres to a member to be coated and hardens, thereby forming a coating. The thickness of the coating is determined depending on the purpose of use of the final coated member. If the thickness is too small, defects tend to develop in the coating. On the other hand, if the thickness is too large, the flexibility drops. Therefore, the thickness of the coating is usually within the range of from about 0.1 to 1.0 mm.

The coating thus formed has an excellent impact resistance, of course, at room temperature and also at temperatures as low as about $-50^\circ$ C., and further exhibits a good flexibility.

The epoxy resin powder coating composition of the present invention can provide a coating having the above-described excellent characteristics, and is therefore very useful as a powder coating composition for anticorrosive coating of ships, vehicles, large-sized structures, and so forth, and also for decoration, anticorrosive coating, electrical insulation, or fixation of electric appliances and so forth.

When the powder coating composition of the present invention is coated on the surface of a steel member, for example, by coating techniques as described above and then hardened by heating, a protective coating exhibiting good adhesion to the steel surface and also excellent impact resistance and flexibility is formed.

The main use of the powder coating composition of the present invention is a protective coating of a steel member. In another embodiment, the present invention provides a steel member with a coating as described above, i.e., a coated steel member. This coated steel member will hereinafter be explained in detail.

In producing the coated steel member, the powder coating composition may be coated directly on the surface of the steel member. It is preferred, however, that the steel surface be subjected to chemical treatment using a phosphate solution, a chromate solution, or a chromium/phosphoric acid solution to thereby form a layer (hereinafter referred to as a "chemically treated layer") and, thereafter, the powder coating composition to form a coating on the chemically treated layer. The coating of the powder coating composition provided on the steel surface through the chemically treated layer exhibits more increased impact resistance over a wide temperature range of from low temperature to high temperature and also excellent flexibility as a result of the synergistic effect of the two layers. Furthermore, the inherent advantages of the chemically treated layer are not deteriorated.

In the production of the coated steel member of the present invention, the chemically treated layer is first formed. Prior to the formation of the chemically treated layer, the steel surface is subjected to preliminary treatment. This preliminary surface treatment roughens the surface of the steel member. This roughening is usually carried out by suitable techniques such as shot blasting and sand blasting so that the surface roughness (the maximum roughness as determined by JIS B0601) is from 10 to 120 μm, preferably the surface roughness is within the above-specified range and is $\frac{1}{4}$ or less of the thickness of the coating of the powder coating composition. If the maximum roughness is less than 10 μm, the anchor effect becomes insufficiently, and the adhesion force of the coating drops. This also leads to reduction in the impact resistance of the coating. On the other hand, if the maximum roughness is more than 120 μm, cracks tend to develop in the coating when an impact is applied thereon. In particular, when the thickness of the coating is too small, e.g., less than 300 μm, this tendency becomes marked, and the impact resistance is decreased.

The chemically treated layer is a layer formed on the steel surface by treating it with a phosphate solution, a chromate solution, or a chromium/phosphoric acid solution. Either a single layer or two or more layers are formed. These treating solutions are known in the art, and solutions conventionally used can be used as they are. The chemical treatment can be carried out by conventional techniques. The solutions are described in detail below.

(A) PHOSPHATE SOLUTION

The phosphate solution is an aqueous solution composed mainly of phosphoric acid, phosphate and an axidizing agent such as nitric acid, which may further contain, depending on the purpose, heavy metals (e.g., Fe, Ni, Co, Ca, Mg, and Cu), anions (e.g., $BO_3$, F, $SiF_6$, $BF_4$, $ClO_3$, and $P_3O_{10}$), and organic acids (e.g., oxalic acid, tartaric acid, citric acid, glyceric acid, tannic acid, and ascorbic acid). When the phosphate solution is coated on the steel member by techniques such as dipping, spraying, and coating, a phosphate layer is formed, which contains as a major component the following compounds.

(1) Iron phosphate-based layer
$FePO_4.2H_2O$ and $\gamma$-$Fe_2O_3$ (2) Zinc phosphate-based layer
$Zn_3(PO_4)_2.4H_2O$, and $ZnFe_2(PO_4)_2.4H_2O$ (3) Manganese phosphate-based layer
$Mn(PO_4)_2.3H_2O$, and $2MnHPO_4.5/2H_2O.FeHPO_4$ (4) Calcium phosphate-based layer
$CaHPO_4.2H_2O$, and $CaHPO_4$ (5) Zinc/calcium phosphate-based layer
$Zn_2Fe(PO_4)_2.4H_2O$, $Zn_2Ca(PO_4)_2.2H_2O$, and $Zn_3(PO_4)_2.4H_2O$ (6) Alkali phosphate-based layer
$Fe_3(PO_4)_2.8H_2O$ (7) Alkali phosphate+$Fe^{++}$+$H_3PO_4$-based layer
$Fe_5H_2(PO_4)_4.4H_2O$

(B) CHROMATE SOLUTION

The chromate solution is basically an aqueous solution containing $Cr^{6+}$ (e.g., $CrO_3$ and $Na_2Cr_2O_7$) as a major component and an anion (e.g., $SO_4$, $SiF_6$, Cl, $NO_3$, and F) as a layer-forming accelerator, which may further contain a pH controller, a water-soluble resin, and so forth, depending on the purpose. It is believed that the layer formed on the steel manner by coating, dipping, electrolysis, and so forth is composed mainly of $xCrO_3.yCr_2O_3.zH_2O$ and further contains other additives.

(C) CHROMIUM/PHOSPHORIC ACID SOLUTION CONTAINING $Cr^{6+}$ AND PHOSPHORIC ACID

This solution is a solution prepared by adding the soluble salts of heavy metals such as Zn and Ni to an aqueous solution containing $Cr^{6+}$ and phosphoric acid. The layer formed on the steel member by dipping, coating, electrolysis, and so forth is considered to be a layer in which iron phosphate, a chromate coating, and the added heavy metal are present as a mixture, although the exact composition is not known.

The thickness of the chemically treated layer is, as expressed in terms of dry weight, from 0.1 to 10 g/m$^2$ and preferably from 0.2 to 5 g/m$^2$. If the thickness is less than the lower limit, the anticorrosion properties are reduced. On the other hand, if the thickness exceeds the upper limit, the adhesion of the chemically treated layer to the coating of the powder coating composition is reduced, resulting in reduction of the impact resistance.

The present invention is described in greater detail by reference to the following examples. All parts are by weight.

EXAMPLE 1

A composition consisting of 100 parts by weight of a bisphenol A-type epoxy resin (epoxy equivalent: 750; ratio of the number of unreactive terminal groups to the total number of groups: 3.5:100), 70 parts of a needle-like glass powder (averge length: 100 μm; average diameter: 10 μm; aspect ratio: 10:1) which had been subjected to surface treatment using N-phenyl-γ-aminopropyltrimethoxysilane, 80 parts of granular titanium dioxide which had been subjected to Zn-Al-Si treatment (average particle diameter: 0.35 μm), 24 parts of a resin (hardener) (hydroxyl group equivalent: 250) prepared by addition reaction of 1 mole of epichlorohydrin and 2 moles of bisphenol, 1.0 part of 2-methylimidazole, 0.6 part of a pigment, and 0.5 part of a leveling agent was melt kneaded in a twin-screw extruder (trade name: TEM-50, manufactured by Toshiba Kikai Co., Ltd.).

The above-kneaded mass was pulverized to a particle size of 120 mesh or less using a hammer mill to obtain an epoxy resin powder coating composition of the present invention. The needle-like glass powder containing in the coating composition had the average length of 95 μm, the average diameter of 10 μm, and the aspect ratio of 10.5:1. The average particle diameter of the granular titanium dioxide was 0.35 μm.

The average length and average diameter of the needle-like glass powder, and the average particle diameter of the granular inorganic filler were measured using a microscope. In measuring the above physical values of the needle-like glass power and granular inorganic filler in the coating composition, the coating composition was dissolved in an organic solvent, diluted, and dried and, thereafter, the values were measured using a microscope.

EXAMPLES 2 TO 5

In each example, an epoxy resin powder coating composition of the present invention was prepared in the same manner as in Example 1 except that the amounts of the needle-like glass powder and titanium dioxide added were changed as shown in Table 1. The sizes of the needle-like glass powder and granular titanium dioxide after pulverization were substantially the same as those in Example 1 and within the ranges of the present invention.

COMPARATIVE EXAMPLES 1 TO 7

In each example, an epoxy resin powder coating composition was prepared in the same manner as in Example 1 except that the amounts of the needle-like glass powder and titanium dioxide added were changed as shown in Table 1.

The epoxy resin powder coating compositions prepared in Examples 1 to 5 and Comparative Examples 1 to 7 were evaluated, and the results obtained are shown in Table 1.

IMPACT RESISTANCE

A hot rolled steel plate (100 mm×100 mm×12 mm) which had been degreased and roughened to a maximum roughness of 50 μm by shot blasting was first heated to 240° C. The epoxy resin powder coating composition was coated on the hot steel plate by electrostatic spraying and then hardened by heating at 200° C. for 10 minutes to form a coating having a thickness of 0.3 to 0.4 mm. This steel plate with the coating was used as a test piece.

This test piece was mounted on a Gardner impact tester, and a tup of fixed weight (weight: 1 kg) with a steel ball (diameter: ⅝ inch) fitted to the top of a rod-shaped iron was dropped on the coating of the test piece. The maximum height at which the coating was not broken was measured. This measurement was carried out at 20° C. and −30° C.

FLEXIBILITY

A coating was prepared in the same manner as in the preparation of the test piece for the measurement of the impact resistance except that a steel plate which had been subjected to release treatment was used as the hot rolled steel plate. This coating was then separated from the steel plate to obtain a film. This film was punched with No. 2 Dumbbell defined in JIS-K-7113. The dumbbell-shaped film thus obtained was subjected to a tensile testing at a tensile speed of 50 mm/min using Tensilon Model UTM-III (manufactured by Toyo Bowldwin Co., Ltd.). The rate of elongation when the film was broken was measured. This measurement was carried out at 20° C. and at −30° C.

SMOOTHNESS

The appearance of the test piece prepared for the measurement of the impact resistance was visually judged.

ANTICORROSION PROPERTIES

A test piece was prepared in the same manner as in the preparation of the test piece for the measurement of the impact resistance. This test piece was immersed in boiling water for 10 days. At the end of the time, the formation of blister in the coating was examined and at the same time, the volume resistivity of the coating was measured.

TABLE 1

| | Amount (parts) | | | | | | | Anticorrosion Properties | |
|---|---|---|---|---|---|---|---|---|---|
| | Needle-Like Glass Powder | Titanium Dioxide | Impact Resistance (cm) 20° C. | Impact Resistance (cm) −30° C. | Flexibility (%) 20° C. | Flexibility (%) −30° C. | Smoothness | Formation of Blister | Volume Resistivity (Ω · cm) |
| Example 1 | 70 | 80 | 120 | 110 | 11.0 | 8.5 | Good | No | $5 \times 10^{13}$ |
| Example 2 | 40 | 130 | 120 | 100 | 14.0 | 10.5 | " | " | $4 \times 10^{13}$ |
| Example 3 | 40 | 40 | 100 | 100 | 13.0 | 11.0 | " | " | $4 \times 10^{13}$ |
| Example 4 | 90 | 40 | 110 | 110 | 10.5 | 9.0 | " | " | $5 \times 10^{13}$ |
| Example 5 | 90 | 130 | 140 | 120 | 10.0 | 8.5 | " | " | $6 \times 10^{13}$ |
| Comparative Example 1 | 20 | 20 | 40 | 20 | 18.0 | 15.0 | " | " | $5 \times 10^{13}$ |
| Comparative Example 2 | 70 | 0 | 80 | 70 | 5.0 | 3.5 | " | " | $5 \times 10^{13}$ |
| Comparative Example 3 | 100 | 10 | 90 | 70 | 4.5 | 3.5 | " | " | $5 \times 10^{13}$ |
| Comparative Example 4 | 150 | 20 | 100 | 110 | 4.0 | 3.2 | Slightly bad | " | $4 \times 10^{13}$ |
| Comparative Example 5 | 20 | 80 | 70 | 35 | 14.0 | 12.5 | Good | " | $5 \times 10^{13}$ |
| Comparative Example 6 | 0 | 200 | 120 | 40 | 13.5 | 10.5 | Slightly bad | " | $3 \times 10^{13}$ |
| Comparative Example 7 | 20 | 200 | 100 | 50 | 10.0 | 9.0 | Slightly bad | " | $3 \times 10^{13}$ |

EXAMPLE 6

A composition consisting of 100 parts of a bisphenol A-type epoxy resin (epoxy equivalent: 850; ratio of the number of unreactive terminal groups to the total number of groups: 3.0:100), 60 parts of a needle-like glass powder (average length: 80 μm; average diameter: 9 μm; aspect ratio: 8.9:1) which had been subjected to surface treatment using γ-glycidoxypropylmethyldiethoxy silane, 80 parts of granular barium sulfate (average particle diameter: 0.25 μm) which had been subjected to Zn-Al-Si treatment, 10 parts of diaminodiphenylmethane, 0.2 part of 2-methylimidazole, 0.5 part of a pigment, and 0.5 part of a leveling agent was melt kneaded in a twin-screw extruder in the same manner as in Example 1.

The above-kneaded mass was then pulverized to a size of 120 mesh or less to obtain an epoxy resin powder coating composition of the present invention. The needle-like glass powder contained in the coating composition thus prepared had the average length of 75 μm, the average diameter of 9 μm, and the aspect ratio of 8.3:1. The average particle diameter of the granular barium sulfate was 0.25 μm.

EXAMPLES 7 AND 8

In each example, an epoxy resin powder coating composition of the present invention are prepared in the same manner as in Example 6 except that the amounts of the needle-like glass powder and barium sulfate added were changed as shown in Table 2.

The sizes of the needle-like glass powder and granular barium sulfate after pulverization were substantially the same as those in Example 6 and fallen within the ranges of the present invention.

COMPARATIVE EXAMPLE 8

An epoxy resin powder coating composition was prepared in the same manner as in Example 6 except that a needle-like glass powder which had been subjected to surface treatment using γ-glycidoxypropylmethyldiethoxysilane, and having an average length of 30 μm, an average diameter of 13 μm, and an aspect ratio of 2.3:1 was used.

COMPARATIVE EXAMPLE 9

An epoxy resin powder coating composition was prepared in the same manner as in Example 6 except that barium sulfate which had been subjected to Zn-Al-Si treatment and having an average particle diameter of 3.0 μm was used.

The characteristics of coating prepared using the epoxy resin powder coating compositions prepared in Examples 6 to 8 and Comparative Examples 8 and 9 were evaluated in the same manner as described above. The results obtained are shown in Table 2.

TABLE 2

| | Amount (parts) | | | | | | | Anticorrosion Properties | |
|---|---|---|---|---|---|---|---|---|---|
| | Needle-Like Glass Powder | Barium Sulfate | Impact Resistance (cm) 20° C. | Impact Resistance (cm) −30° C. | Flexibility (%) 20° C. | Flexibility (%) −30° C. | Smoothness | Formation of Blister | Volume Resistivity (Ω · cm) |
| Example 6 | 60 | 80 | 125 | 115 | 12.0 | 9.5 | Good | No | $4 \times 10^{13}$ |
| Example 7 | .60 | 40 | 110 | 105 | 11.5 | 9.5 | " | " | $4 \times 10^{13}$ |
| Example 8 | 60 | 130 | 130 | 120 | 12.5 | 9.5 | " | " | $4 \times 10^{13}$ |
| Comparative Example 8 | 60 | 80 | 95 | 50 | 11.5 | 8.5 | " | " | $4 \times 10^{13}$ |
| Comparative | 60 | 80 | 100 | 90 | 4.0 | 3.0 | Slightly | " | $4 \times 10^{13}$ |

TABLE 2-continued

| | Amount (parts) Needle-Like Glass Powder | Barium Sulfate | Impact Resistance (cm) 20° C. | −30° C. | Flexibility (%) 20° C. | −30° C. | Smoothness | Anticorrosion Properties Formation of Blister | Volume Resistivity (Ω · cm) |
|---|---|---|---|---|---|---|---|---|---|
| Example 9 | | | | | | | bad | | |

EXAMPLE 9

100 parts of a bisphenol A-type epoxy resin (epoxy equivalent: 750; ratio of the number of unreactive terminal groups to the total number of groups: 3.5:100), 110 parts of a needle-like powder (average length: 100 μm; average diameter: 9 μm; aspect ratio: 10:1) which had been subjected to surface treatment using N-phenyl-γ-aminopropyltrimethoxysilane, and 50 parts of granular titanium dioxide which had been subjected to Zn-Al-Si treatment (average particle diameter: 0.35 μm) were melt mixed in a planetary mixer at 130° C. for 2 hours, taken out from the mixer, cooled, and then pulverized using a hammer mill.

To 270 parts of the pulverized product as obtained above were added 24 parts of a resin (hardener) (hydroxyl group equivalent: 250) prepared by addition reaction of 1 mole of epichlorohydrin and 2 moles of bisphenol, 1.0 part of 2-methylimidazole, 0.5 part of a pigment, and 0.5 part of a leveling agent. The composition thus prepared was melt kneaded in a twin-screw extruder.

The above-kneaded mass was pulverized to a particle size of 120 mesh or less using a manner mill to obtain an epoxy resin powder coating composition of the present invention. The needle-like glass powder contained in the coating composition had the average length of 80 μm, the average diameter of 10 μm, and the aspect ratio of 8.0:1. The average particle diameter of the granular titanium dioxide was 0.35 μm.

EXAMPLES 10 TO 12

In each example, an epoxy resin powder coating composition of the present invention was prepared in the same manner as in Example 9 except that the amounts of the needle-like glass powder and titanium dioxide added were changed as shown in Table 3.

The sizes of the needle-like glass powder and granular titanium dioxides after pulverization were substantially the same as those in Example 9 and fallen within the ranges of the present invention.

COMPARATIVE EXAMPLES 10 TO 16

In each example, an epoxy resin powder coating composition was prepared in the same manner as in Example 9 except that the amount of the needle-like glass powder and titanium dioxide added were changed as shown in Table 3.

The characteristics of coating prepared using the epoxy resin powder coating composition prepared in Examples 9 to 12 and Comparative Examples 10 to 16 were evaluated in the same manner as described above. The results obtained are shown in Table 3.

TABLE 3

| | Amount (parts) Needle-Like Glass Powder | Titanium Dioxide | Impact Resistance (cm) 20° C. | −30° C. | Flexibility (%) 20° C. | −30° C. | Smoothness | Anticorrosion Properties Formation of Blister | Volume Resistivity (Ω · cm) |
|---|---|---|---|---|---|---|---|---|---|
| Example 9 | 110 | 50 | 250 | 180 | 10.0 | 8.0 | Good | No | $6 \times 10^{13}$ |
| Example 10 | 110 | 80 | 260 | 185 | 9.5 | 8.0 | " | " | $7 \times 10^{13}$ |
| Example 11 | 160 | 40 | 280 | 210 | 9.0 | 7.5 | " | " | $6 \times 10^{13}$ |
| Example 12 | 160 | 80 | 290 | 210 | 9.0 | 7.5 | " | " | $7 \times 10^{13}$ |
| Comparative Example 10 | 20 | 20 | 40 | 20 | 18.0 | 15.0 | " | " | $4 \times 10^{13}$ |
| Comparative Example 11 | 120 | 0 | 90 | 80 | 5.0 | 3.0 | " | " | $5 \times 10^{13}$ |
| Comparative Example 12 | 120 | 10 | 100 | 80 | 6.0 | 3.5 | " | " | $5 \times 10^{13}$ |
| Comparative Example 13 | 20 | 80 | 70 | 35 | 14.0 | 12.5 | " | " | $5 \times 10^{13}$ |
| Comparative Example 14 | 0 | 200 | 120 | 40 | 13.5 | 10.5 | Slightly bad | " | $7 \times 10^{13}$ |
| Comparative Example 15 | 200 | 0 | 150 | 130 | 3.5 | 3.0 | Bad | " | $6 \times 10^{13}$ |
| Comparative Example 16 | 220 | 200 | No coating was formed. | | | | | | |

EXAMPLE 13

100 parts of a bisphenol A-type epoxy resin (epoxy) equivalent: 850; ratio of the number of unreactive terminal groups to the total number of groups: 3.0:100), 120 parts of a needle-like glass powder (average length: 80 μm; average diameter: 9 μm; aspect ratio: 8.9:1) which had been subjected to surface treatment using γ-glycidoxypropylmethyldiethoxysilane, and 80 parts of granular barium sulfate which had been subjected to Zn-Al-Si treatment (average grain diameter: 0.25 μm) were melt mixed in a planetary mixer at 130° C. for 2 hours, taken out from the mixer, cooled, and then pulverized using a hammer mill.

To 300 parts of the pulverized product as obtained above were added 10 parts of diaminodiphenylmethane, 0.2 part of 2-methylimidazole, 0.5 part of a pigment, and 0.5 part of a leveling agent. The resulting composition was melt kneaded in a twin-screw extruder in the same manner as in Example 9 and then pulverized to a particle size of 120 mesh or less to obtain an epoxy resin powder coating composition of the present invention. The needle-like glass powder contained in the coating composition had the average length of 70 μm, the average diameter of 9 μm, and the aspect ratio of 7.8:1. The average particle diameter of granular barium sulfate was 0.25 μm.

EXAMPLE 14

An epoxy resin powder coating composition of the present invention was prepared in the same manner as in Example 13 except that the amount of the needle-like glass powder and barium sulfate added were changed as shown in Table 4.

The sizes of the needle-like glass powder and granular barium sulfate after pulverization were substantially the same as those in Example 13 and fallen within the ranges of the present invention.

COMPARATIVE EXAMPLE 17

An epoxy resin powder coating composition was prepared in the same manner as in Example 13 except that a needle-like glass powder which had been subjected to surface treatment using γ-glycidoxypropylmethyldiethoxysilane and having an average length of 30 μm, an average diameter of 13 μm, and an aspect ratio of 2.3:1 was used.

COMPARATIVE EXAMPLE 18

An epoxy resin powder coating composition was prepared in the same manner as in Example 13 except that barium sulfate which had been subjected to Zn-Al-Si treatment and having an average particle diameter of 3.0 μm was used.

The characteristics of coating prepared using the epoxy resin powder coating composition prepared in Examples 13 and 14, and Comparative Examples 17 and 18 were evaluated. The results obtained are shown in Table 4.

TABLE 4

| | Amount (parts) | | Impact Resistance (cm) | | Flexibility (%) | | | Anticorrosion Properties | |
|---|---|---|---|---|---|---|---|---|---|
| | Needle-Like Glass Powder | Barium Sulfate | 20° C. | −30° C. | 20° C. | −30° C. | Smoothness | Formation of Blister | Volume Resistivity (Ω · cm) |
| Example 13 | 120 | 80 | 260 | 180 | 9.0 | 8.0 | Good | No | $7 \times 10^{13}$ |
| Example 14 | 120 | 40 | 250 | 180 | 9.5 | 8.0 | " | " | $7 \times 10^{13}$ |
| Comparative Example 17 | 120 | 80 | 150 | 60 | 10.0 | 8.0 | " | " | $6 \times 10^{13}$ |
| Comparative Example 18 | 120 | 80 | 180 | 110 | 3.5 | 3.0 | Slightly bad | " | $7 \times 10^{13}$ |

It can be seen from the above results that the epoxy resin powder coating composition of the present invention provides a coating exhibiting excellent impact resistance not only at room temperature but also at low temperatures, and further having good flexibility.

EXAMPLE 15

A steel plate (150 mm×70 mm×3.2 mm) which had been degreased was roughened to a maximum roughness of 50 μm by shot blasting and then treated with a zinc phosphate-based solution to form 3.0 g/m$^2$ (dry basis) of a zinc phosphate-based layer made mainly of $Zn_3(PO_4).4H_2O$ and $ZnFe_2(PO_4)_2.4H_2O$. Four steel plates with the above layer were prepared by this manner.

The epoxy resin powder coating compositions prepared in Examples 1 to 4 were each coated on the steel plate by the fluidized bed coating method under conditions of preheating temperature of 200° C., hardening temperature of 200° C., and hardening time of 15 minutes to form a 0.4 mm thick coating.

EXAMPLE 16

The same steel plate as used in Example 15 was roughened to a maximum roughness of 80 μm, and then treated with a chromate solution composed mainly of $CrO_3$ and $SiO_2$ to form 1.5 g/m$^2$ (dry basis) of a chromium-based layer made mainly of $Cr_2O_3$ and $CrO_3$. Three steel plates with the layer were prepared by this manner.

The epoxy resin powder coating compositions prepared in Examples 5 to 7 were each coated on the steel plate in the same manner as in Example 15.

EXAMPLE 17

The same steel plate as used in Example 15 was roughened to a maximum roughness of 40 μm, and then treated with a chromium/phosphoric acid solution composed mainly of $Cr^{6+}$ and phosphoric acid to form 4.5 g/m$^2$ (dry basis) of a layer made mainly of iron phosphate and chromate. Four steel plates were prepared by this manner.

The epoxy resin powder coating compositions prepared in Examples 8 to 11 were each coated on the steel plate in the same manner as in Example 15.

EXAMPLE 18

The same steel plate as used in Example 15 was roughened to a maximum roughness of 50 μm, and then treated with a chromate solution composed mainly of $CrO_3$ and $SiO_2$ to form 2.0 g/m$^2$ (dry basis) of a chromium-based layer made mainly of $Cr_2O_3$ and $CrO_3$.

The epoxy resin powder coating compositions prepared in Examples 12 to 14 were each coated on the steel plate by the preheating electrostatic coating method under coating conditions of preheating temperature of 230° C., hardening temperature of 200° C., and hardening time of 10 minutes to form a 0.4 mm thick coating.

The coating steel plates prepared in Examples 15 to 18 were tested for the following properties. The results obtained are shown in Table 5.

IMPACT RESISTANCE

Same as described above, with the exception that the measurement was conducted at −30° C., 20° C., and 80° C.

FLEXIBILITY

A strain gauge was attached to the surface of the coated steel plate, and both ends of the coated steel plate were fixed. A semi-circular mold having various radii was pressed onto the coated steel plate in such a manner that the surface with the strain gauge was stretched. The maximum elongation of the coating at which the coating was not broken was measured. This measurement was conducted at −30° C. and 20° C.

ADHESION FORCE AFTER BRINE SPRAYING TEST

The coated steel plate was subjected to a brine spraying test according to JIS-Z-2371 for 2,000 hours. At the end of time, fine lines were cut in the coating in both the lengthwise and widthwise directions at 3 mm intervals with a sharp cutter so that the top of the cutter reached the steel plate, according to DIN 53 151 to form 25 squares. The adhesion force was determined as to whether or not the coating was peeled off and rated as from Gt0 to Gt4.

ADHESION FORCE AFTER DIPPING IN BRINE AT 80° C.

The coated steel plate was dipped in a 3% aqueous NaCl solution maintained at 80° C. for 1,000 hours. At the end of the time, five lines were cut in the coating in both the lengthwise and widthwise directions with a sharp cutter so that the top of the cutter reached the steel plate, according to DIN 53 151 to thereby form 25 squares. The adhesion force was determined as to whether or not the coating was peeled apart and rated as from Gt0 to Gt4.

TABLE 5

| | Surface Roughness (Maximum Roughness) (μm) | Type of Powder Coating Composition | Chemical Treatment | | Thickness of Epoxy Coating (mm) | Impact Resistance | | | Flexibility | | Adhesion Force after Brine Spraying for 2000 Hours | Adhesion Force after Dipping in Brine at 80° C. |
|---|---|---|---|---|---|---|---|---|---|---|---|---|
| | | | Type of Solution | Amount g/m$^2$ | | −30° C. (kgm) | 20° C. (kgm) | 80° C. (kgm) | −30° C. (%) | 20° C. (%) | | |
| Example 15 | 50 | Composition of Example 1 | Phosphoric acid-based | 3.0 | 0.4 | 110 | 120 | 110 | 4.5 | 6.0 | GtO | GtO |
| | 50 | Composition of Example 2 | Phosphoric acid-based | 3.0 | 0.4 | 100 | 120 | 100 | 5.0 | 6.5 | GtO | GtO |
| | 50 | Composition of Example 3 | Phosphoric acid-based | 3.0 | 0.4 | 100 | 100 | 100 | 5.0 | 6.0 | GtO | GtO |
| | 50 | Composition of Example 4 | Phosphoric acid-based | 3.0 | 0.4 | 110 | 110 | 110 | 4.5 | 5.5 | GtO | GtO |
| Example 16 | 80 | Composition of Example 5 | Chromate-based | 1.5 | 0.4 | 120 | 140 | 120 | 4.5 | 5.5 | GtO | GtO |
| | 80 | Composition of Example 6 | Chromate-based | 1.5 | 0.4 | 115 | 125 | 110 | 4.5 | 6.0 | GtO | GtO |
| | 80 | Composition of Example 7 | Chromate-based | 1.5 | 0.4 | 105 | 110 | 110 | 4.5 | 5.5 | GtO | GtO |
| Example 17 | 40 | Composition of Example 8 | Chromium/phosphoric acid-based | 4.5 | 0.4 | 120 | 130 | 110 | 4.5 | 6.5 | GtO | GtO |
| | 40 | Composition of Example 9 | Chromium/phosphoric acid-based | 4.5 | 0.4 | 180 | 250 | 170 | 4.0 | 5.0 | GtO | GtO |
| | 40 | Composition of Example 10 | Chromium/phosphoric acid-based | 4.5 | 0.4 | 185 | 260 | 180 | 4.0 | 5.0 | GtO | GtO |
| | 40 | Composition of Example 11 | Chromium/phosphoric acid-based | 4.5 | 0.4 | 210 | 280 | 200 | 4.0 | 5.0 | GtO | GtO |
| Example 18 | 50 | Composition of Example 12 | Chromate-based | 2.0 | 0.4 | 210 | 290 | 200 | 4.0 | 5.0 | GtO | GtO |
| | 50 | Composition of Example 13 | Chromate-based | 2.0 | 0.4 | 180 | 260 | 170 | 4.0 | 5.0 | GtO | GtO |
| | 50 | Composition of Example 14 | Chromate-based | 2.0 | 0.4 | 180 | 250 | 170 | 4.0 | 5.0 | GtO | GtO |

It can be seen from the above results that the present invention provides a coated steel plate exhibiting good anticorrosion properties, and having excellent impact resistance and flexibility.

While the invention has been described in detail and with reference to specific embodiments thereof, it will be apparent to one skilled in the art that various changes and modifications can be made therein without departing from the spirit and scope thereof.

What is claimed is:

1. An epoxy resin powder coating composition comprising an epoxy resin with at least a hardener and a filler added thereto, wherein the filler is a mixture of from 30 to 180 parts by weight per 100 parts by weight of the epoxy resin of a needle-like glass powder having an average length of at least 40 μm and an aspect ratio of at least 4:1, and at least 30 parts by weight per 100 parts by weight of the epoxy resin of a granular inorganic filler having an average particle diameter of 1.0 μm or less and wherein the needle-like glass powder is surface treated with aminosilane, epoxysilane, or mercaptolsilane, and the granular inorganic filler is subjected to surface treatment to increase its affinity to the epoxy resin.

2. The powder coating composition as in claim 1, wherein the needle-like glass powder has an average length of at least 50 μm and an aspect ratio of at least 5:1.

3. The powder coating composition as in claim 1, wherein the needle-like glass powder has an average length of from 50 to 350 μm and an aspect ratio of from 5:1 to 100:1.

4. The powder coating composition as in claim 1, wherein the needle-like glass powder has an average diameter of from 1 to 30 μm.

5. The powder coating composition as in claim 1, wherein the amount of the needle-like glass powder added is from 50 to 160 parts by weight.

6. The powder coating composition as in claim 1, wherein the amount of the needle-like glass powder added is from 60 to 150 parts by weight.

7. The powder coating composition as in claim 1, wherein the granular inorganic filler has an aspect ratio of from 2:1 or less.

8. The powder coating composition as in claim 1, wherein the granular inorganic filler has an average particle diameter of from 0.1 to 0.7 μm.

9. The powder coating composition as in claim 1, wherein the amount of the granular inorganic filler added is from 30 to 150 parts by weight.

10. The powder coating composition as in claim 1, wherein the amount of the granular inorganic filler added is from 40 to 140 parts by weight.

11. The powder coating composition as in claim 1, wherein the ratio of the number of unreactive terminal groups to the total number of groups of the epoxy resin is less than 5:100.

12. The powder coating composition as in claim 1, wherein the epoxy resin is a bisphenol A-type epoxy resin.

* * * * *